(12) United States Patent
Sahala

(10) Patent No.: US 6,711,252 B2
(45) Date of Patent: Mar. 23, 2004

(54) METHOD AND SYSTEM FOR IMPLEMENTING INTERMEDIARY SERVICES IN A TELECOMMUNICATION SYSTEM

(75) Inventor: Kai Tapio Sahala, Vantaa (FI)

(73) Assignee: Nokia Corporation, Espoo (FI)

( * ) Notice: Subject to any disclaimer, the term of this patent is extended or adjusted under 35 U.S.C. 154(b) by 179 days.

(21) Appl. No.: 10/055,323

(22) Filed: Jan. 22, 2002

(65) Prior Publication Data

US 2002/0146109 A1 Oct. 10, 2002

Related U.S. Application Data

(63) Continuation of application No. PCT/FI00/00659, filed on Jul. 25, 2000.

(30) Foreign Application Priority Data

Aug. 3, 1999 (FI) .................................................. 991668

(51) Int. Cl.[7] .............................................. H04M 7/00
(52) U.S. Cl. .................. 379/221.15; 379/229; 379/230; 379/901
(58) Field of Search ................................ 379/229, 242, 379/221.15, 230, 201.01, 201.02, 201.05, 231, 901

(56) References Cited

U.S. PATENT DOCUMENTS

| | | | | | |
|---|---|---|---|---|---|
| 5,226,075 | A | * | 7/1993 | Funk et al. .................. | 379/243 |
| 5,553,130 | A | * | 9/1996 | Turner ......................... | 379/220 |
| 5,768,358 | A | * | 6/1998 | Venier et al. ................ | 379/207 |
| 5,892,821 | A | * | 4/1999 | Turner ......................... | 379/220 |
| 5,956,652 | A | * | 9/1999 | Eriksson ...................... | 455/555 |
| 6,175,622 | B1 | * | 1/2001 | Chiniwala et al. .......... | 379/211 |
| 6,453,035 | B1 | * | 9/2002 | Psarras et al. ......... | 379/221.08 |

* cited by examiner

Primary Examiner—William J. Deane, Jr.
(74) Attorney, Agent, or Firm—Squire, Sanders & Dempsey L.L.P.

(57) ABSTRACT

The invention concerns a method and a system for implementing a centralized intermediary service in a telecommunication system comprising a telephone network, which comprises one or more telephone exchanges; a private numbering plan provided in the telephone network; a telephone exchange belonging to the telephone network and implementing the private numbering plan; and an intermediary. In the method, one or more virtual private networks are established in the telecommunication system and the private numbering plan established is used for internal calls within the virtual private network. Further, the intermediary is connected to the telephone exchange; and the signalling of the virtual private network is used for the production of intermediary services. The signalling used for the production of intermediary services is e.g. QSIG signalling.

16 Claims, 4 Drawing Sheets

Figure 1:
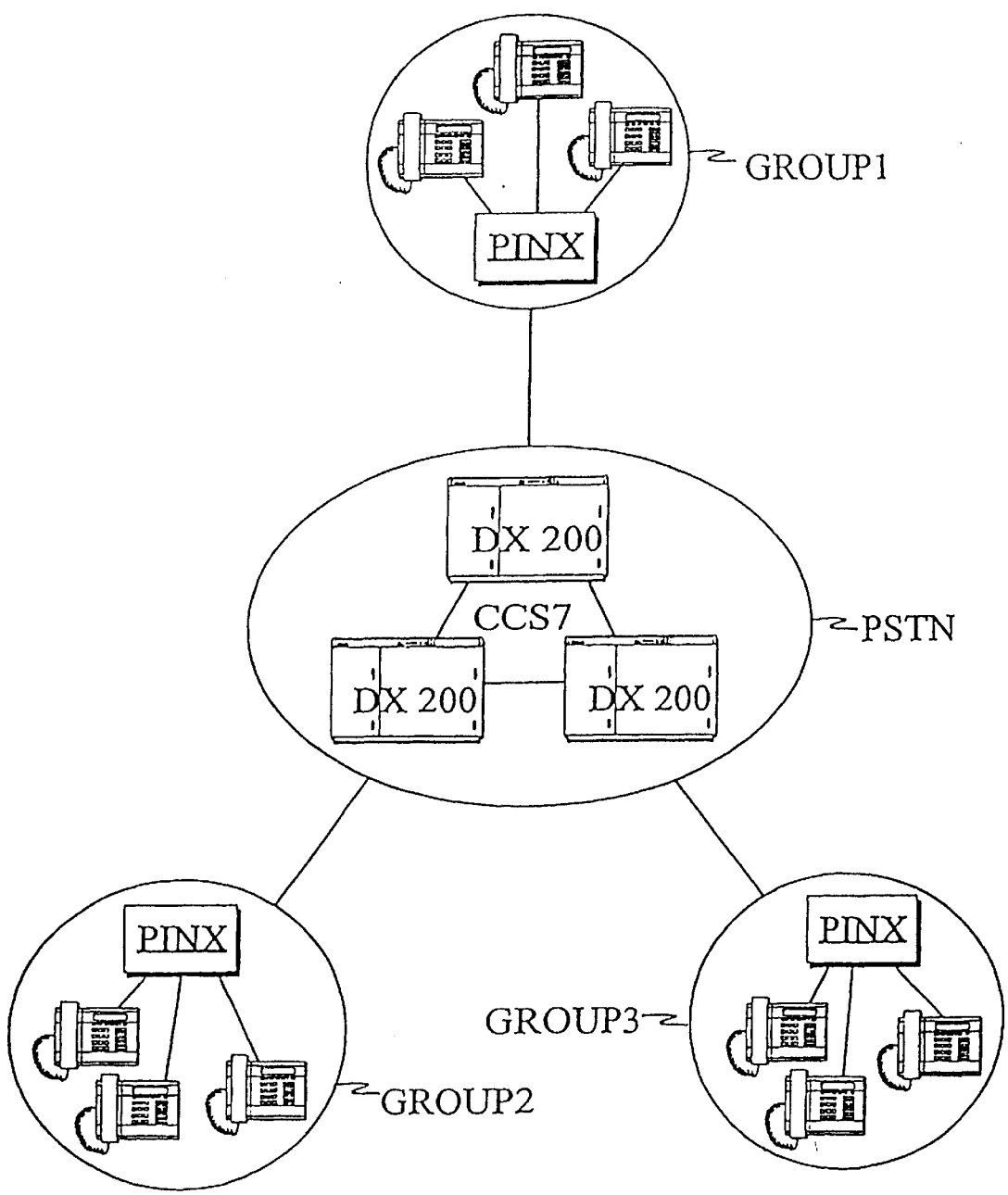

METHOD AND SYSTEM FOR IMPLEMENTING INTERMEDIARY SERVICES IN A TELECOMMUNICATION SYSTEM

This is a continuation of PCT/FI60/00659 filed on Jul. 25, 2000.

FIELD OF THE INVENTION

The present invention relates to telecommunication systems. In particular, the invention concerns a new type of method and system for implementing intermediary services.

BACKGROUND OF THE INVENTION

'Virtual Private Network' (VPN) means a network that allows the transmission of private communications using the resources of the Public Switched Telephone Network (PSTN). In this way, it is possible to interconnect company offices geographically situated in different areas. Offices can also be connected to each other using semifixed lines. However, this alternative is less effective and more expensive than the first mentioned one.

Using a virtual private network, it is possible to interconnect Centrex subscriber groups, Public Branch Exchanges (PBX) and individual subscribers. 'Centrex subscriber group' refers to a subscriber group that, without being connected to a separate public branch exchange, can utilize functions typical of extensions connected to one. These functions are to be understood as referring to the services produced by a public branch exchange, e.g. services such as Call Hold and Three Party Service. A Centrex subscriber group is so implemented in a telephone switching center that the switching center will provide services like those of a public branch exchange or PBX network, yet without separate public branch exchanges.

A feature typical of the functions of a virtual private network is a private numbering plan. This is a telecommunication service that allows the subscriber to use subscriber numbers deviating from the public numbering plan for communication between certain subscriptions within the area of one or more networks. A numbering plan can be implemented e.g. by reserving subscriber numbers beginning with a given combination of digits for use by a company or a similar community. Correspondingly, a separate billing system can be introduced in a VPN network. It is possible to define lower rates to be charged for internal calls within the VPN network than for outgoing calls from the VPN network.

A telephone exchange supporting the VPN service is provided with a special database in which are stored all the numbers included in the public numbering plan that correspond to the private numbering plan. The VPN service can be extended so as to allow it to be used between several telephone exchanges. This may be so implemented that a corresponding database is provided in each exchange. In the signalling between two VPN exchanges, a number included in a private numbering plan is converted into a number included in the public numbering plan. The subscriber, which may be e.g. an analog subscriber, an ISDN subscriber (ISDN, Integrated Services Digital Network) or a branch exchange, dials the numbers and the public network exchange performs the number conversion. If the subscriber dials a number included in a private numbering plan, then the public network exchange will convert the number into a number consistent with the public numbering plan. In other words, the public telephone network uses numbers consistent with the public numbering plan, which are converted in VPN exchanges so that the users of terminal equipment will see the numbers consistent with the private numbering plan. Each client may have a different numbering plan. A VPN network is always a client-specific network and therefore the network is configured so as to meet the needs of the client.

In a virtual private network, it is possible to use signalling consistent with the QSIG standard. QSIG is ISDN common channel signalling designed for use in private networks. The QSIG signalling was developed by an open group of companies comprising all of the largest European manufacturers of branch exchanges. The abbreviation QSIG refers to signalling transmitted over an ISDN Q-point. The Q-point is a logical signalling point between two PINX's (PINX, Private Integrated services Network exchange). QSIG defines a number of protocols which can be used for interaction between a plurality of PINX's. A PINX is connected to the nearest telephone exchange e.g. via a 2 Mbit/s link used to carry QSIG signalling. A QSIG protocol largely resembles the ITU-T (International Telecommunication Union) Q.931 protocol. The essential difference between these is that Q.931 is an asymmetric protocol while QSIG is symmetric.

A PBX-network intermediary generally works under one of the main PBX's. In this context, 'intermediary' refers e.g. to a telephone set equipped for intermediary services or to a computer provided with facilities for intermediary services. The concept of 'intermediary' may further comprise a human user of the above-mentioned equipment. Furthermore, in VPN it is possible to centralize intermediary services by building a fixed connection between the intermediary and the branch exchange. In this case, one intermediary can only serve one network at a time. However, this solution involves problems regarding load distribution and routing. The services produced by an intermediary include e.g. CLIP/CLIR (CLIP, Calling Line Identification Presentation; CLIR, Calling Line Identification Restriction), COLP/COLR (COLP, Connected Line Identification Presentation; COLR, Connected Line Identification Restriction), Call transfer, Call offer, Call intrusion and Common information.

The object of the present invention is to eliminate the drawbacks referred to above or at least to significantly alleviate them. A specific object of the invention is to disclose a new type of method and system for implementing intermediary services. In the method, an intermediary in a virtual private network is centralized in a public network exchange. When e.g. the standardized signalling for a QSIG branch exchange network is used, the intermediary can use the same services that would be possible if the intermediary were connected directly to a branch exchange.

As for the features characteristic of the present invention, reference is made to the claims.

BRIEF DESCRIPTION OF THE INVENTION

The method of the invention concerns the implementation of a centralized intermediary service in a telecommunication system. The telecommunication system of the invention comprises a telephone network, preferably an ISDN network. The telephone network comprises one or more telephone exchanges. However, ISDN network is only an example of telephone networks applicable. Implemented in the telephone network is a Private Numbering Plan (PNP), allowing the use of abbreviated numbers within the network. The system further comprises a telephone exchange forming part of the telephone network and implementing the private numbering plan. The telephone exchange comprises a readiness for implementing VPN services. Moreover, the system of the invention comprises an intermediary which takes care of communication in the VPN network.

In the method, one or more virtual private networks are created in the telecommunication system and a private numbering plan established is used for internal calls in the virtual private network. According to the invention, the intermediary is logically connected to the telephone exchange and the signalling of the virtual private network is used for the production of intermediary services. Intermediary services are produced using e.g. QSIG signalling. The signalling used may alternatively be DPNSS (DPNSS, Digital Private Network Signalling System), DSS1+ (DSS, Digital Subscriber Signalling System) or some other signalling. DPNSS is a protocol developed by British Telecom and PINX manufacturers. The DSS1+ protocol is defined in ETSI (European Telecommunication Standardization Institute) standards EN 301 060-1 and EN 301 061-1.

In a preferred embodiment, the intermediary is connected to one or more virtual private networks. For each virtual private network, a separate private numbering plan can be defined. When a call is being set up, the signalling message contains data indicating which virtual private network the subscriber belongs to. Thus it is possible to identify the numbering plan being used. The telephone exchange performs the number conversion between the internal numbering of the private network and the public numbering plan.

In a preferred embodiment of the invention, a numbering table enabling the provision of centralized intermediary services is implemented in the telephone exchange and/or intermediary.

In a preferred embodiment of the invention, the telephone network is connected to an Intelligent Network (IN) and a numbering table enabling the provision of centralized intermediary services is implemented in a database in the intelligent network.

In a preferred embodiment of the invention, internal signalling within the telephone network is implemented using an ISUP protocol (ISUP, ISDN User Part). Messages related to a virtual private network are transmitted e.g. by encapsulating them inside ISUP messages. In this way, it is possible to implement a transparency of message traffic within the public telephone network.

In the system of the present invention, the intermediary is connected to a telephone exchange. The system comprises means for using the signalling of a virtual private network for the production of intermediary services.

In a preferred embodiment of the invention, the system comprises means for using QSIG signalling for the production of intermediary services.

In a preferred embodiment of the invention, the system comprises means for using DPNSS signalling for the production of intermediary services.

In a preferred embodiment of the invention, the system comprises means for using DSS1+ signalling for the production of intermediary services.

In a preferred embodiment of the invention, the system comprises means for serving one or more virtual private networks and a numbering table enabling the provision of centralized intermediary services.

In a preferred embodiment of the invention, the system comprises an intelligent network connected to the telephone network and, located in a database in the intelligent network, a numbering table enabling the provision of centralized intermediary services.

In a preferred embodiment of the invention, the system comprises an ISUP protocol used for internal signalling within the telephone network.

The invention makes it possible for an intermediary to produce the same services that would be possible if it were connected directly to a private branch exchange. In addition, the invention makes it possible for a single intermediary to serve several VPN networks simultaneously. Furthermore, the invention makes it possible for a single intermediary to serve several VPN networks, i.e. several enterprises, via the same user interface. The invention also makes it easier for the operator to centralize services and distribute resources.

LIST OF ILLUSTRATIONS

Figure 2:
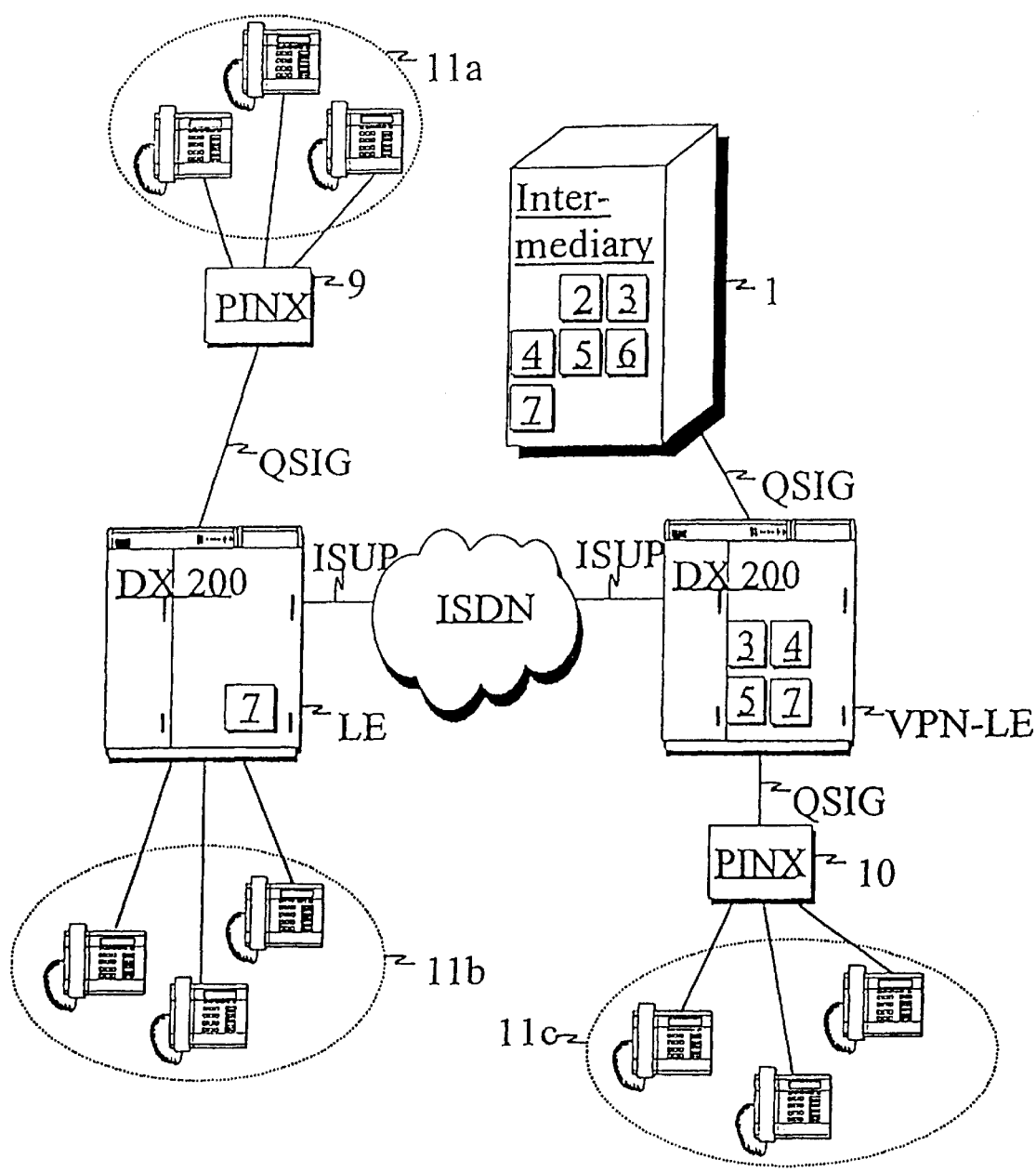
Figure 3:
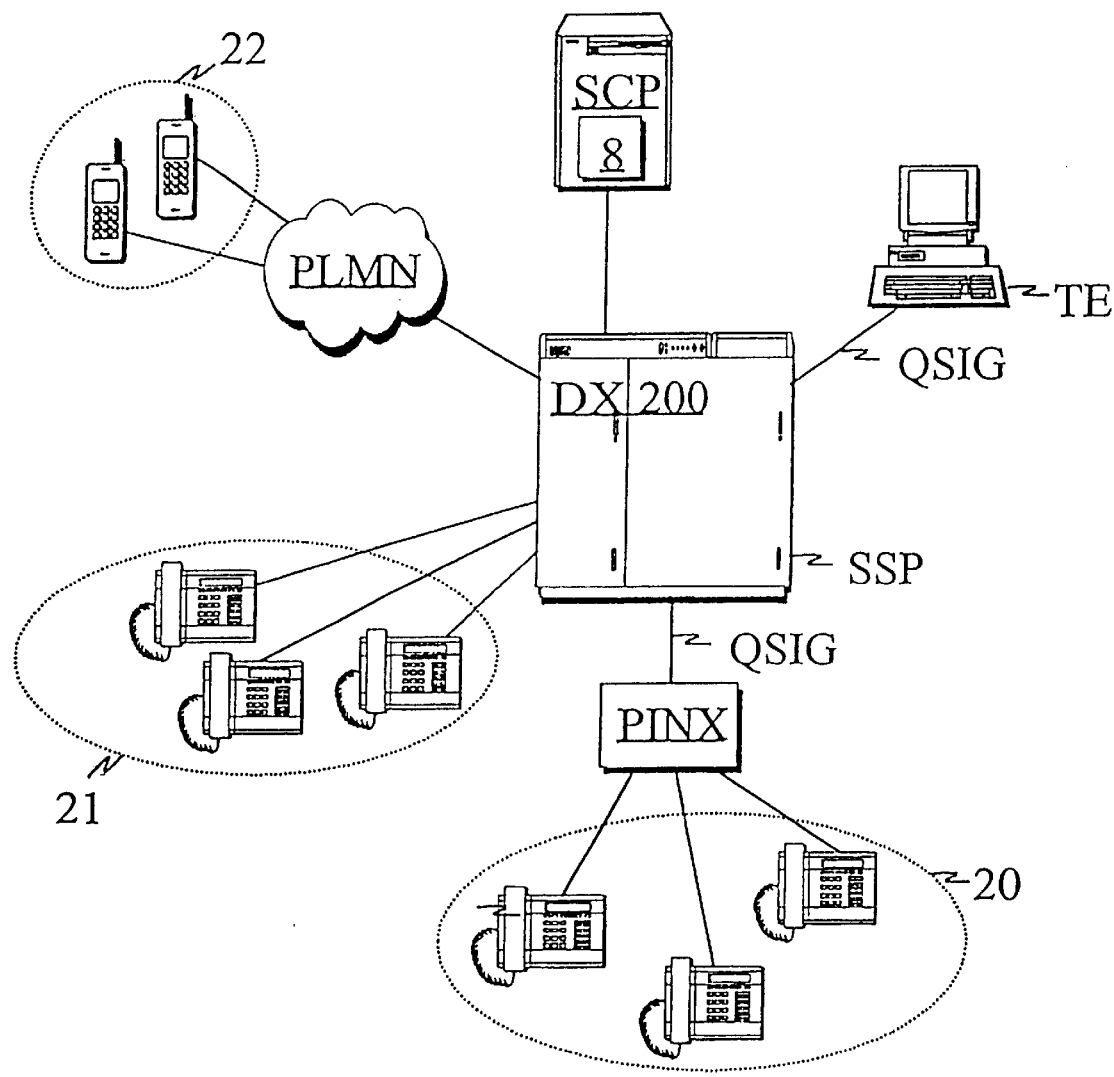
Figure 4:
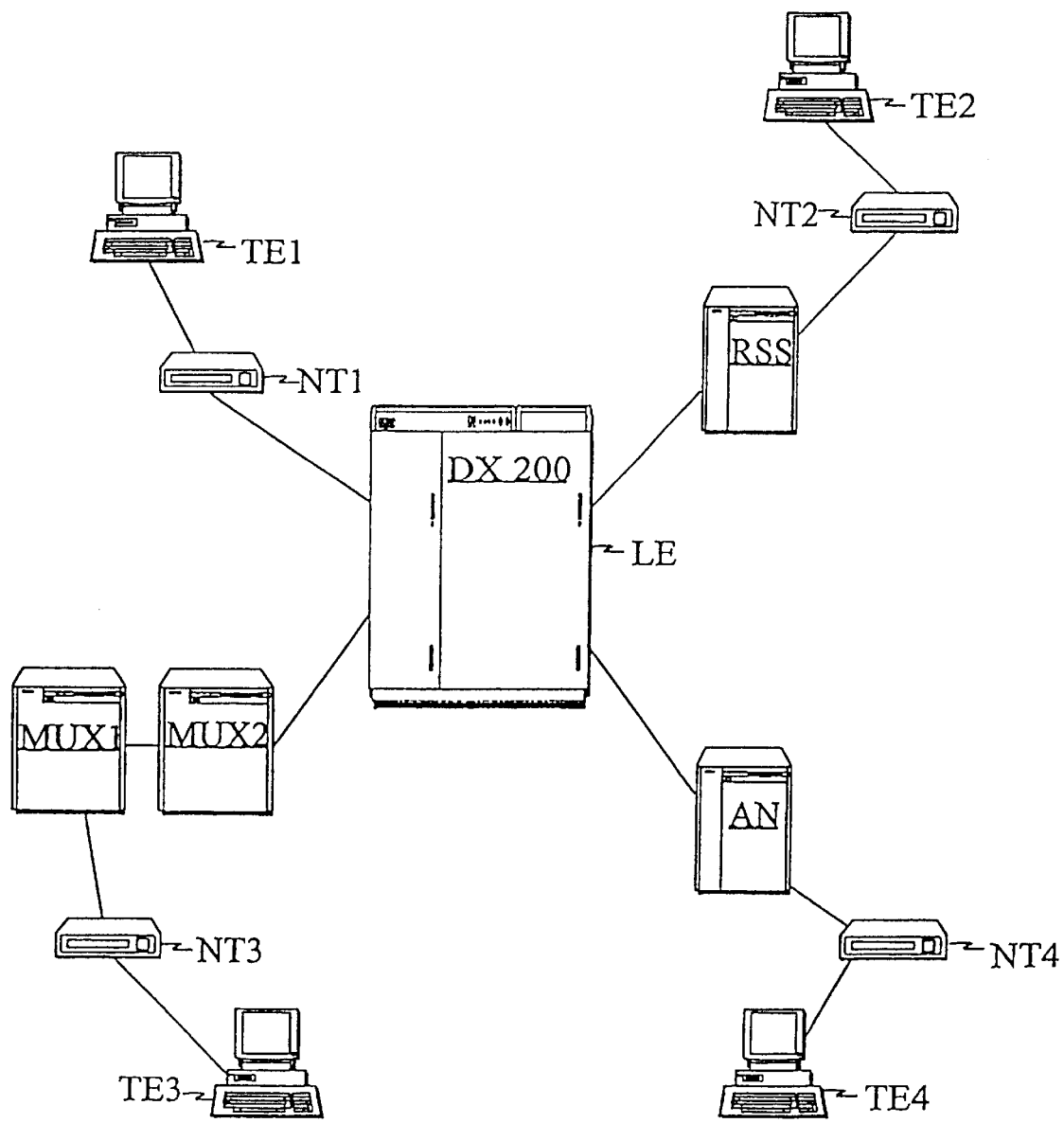

In the following, the invention will be described in detail by the aid of a few examples of its embodiments, wherein FIG. 1 presents an example illustrating the principle of a QSIG network, FIG. 2 presents an embodiment of the system of the invention, FIG. 3 presents another embodiment of the system of the invention, and FIG. 4 presents a preferred example of how an intermediary can be connected to a telephone exchange.

DETAILED DESCRIPTION OF THE INVENTION

FIG. 1 presents an example illustrating the principle of a QSIG network. In this example, the system comprises a public switched telephone network PSTN comprising three telephone exchanges. The telephone exchange is e.g. a DX 200 manufactured by the applicant. The telephone exchanges are connected to each other and they use CCS7 common channel signalling (CCS, Common Channel Signalling) for intercommunication between themselves. Connected to the telephone network PSTN are three subscriber groups, GROUP1, GROUP2 and GROUP3. Each subscriber group comprises a private branch exchange PINX and three telecommunication terminals connected to it. The telecommunication terminals are e.g. analog or digital telephones. In this example, QSIG signalling is used between the subscriber group and the telephone network. The services to be used are implemented using QSIG signalling.

The system presented in FIG. 2 comprises telephone exchanges LE and VPN-LE. These are interconnected via a telephone network ISDN. In this example, an ISDN network is only given as an example of telephone networks applicable. Logically connected to telephone exchange VPN-LE are an intermediary 1 and a private branch exchange 10. In this example, the intermediary is connected directly to the telephone exchange via a basic rate ISDN interface. The basic rate interface contains two data channels and a signalling channel. Let it be noted that this is only one of the possible alternatives for connecting the intermediary to the telephone exchange. FIG. 4 presents a few examples of the ways in which an intermediary can be connected to a telephone exchange.

In this context, 'intermediary' means e.g. a telephone set equipped for intermediary services or a computer provided with facilities for intermediary services. Further, the word 'intermediary' may comprise a human user of the abovementioned equipment. Between the intermediary 1 and the telephone exchange VPN-LE, e.g. QSIG signalling is used. Under branch exchange 10 there is a subscriber group 11c which in this example comprises three telecommunication terminals. Between the branch exchange 10 and the telephone exchange VPN-LE, e.g. QSIG signalling is used. In the above-mentioned cases, QSIG signalling is a preferred example of the signalling to be used. Other possible signalling alternatives are DSS1+ and DPNSS. In a system as illustrated in FIG. 2, the internal signalling used in the telephone network is preferably ISUP signalling.

Connected to telephone exchange LE, which may be a DX 200 switching center manufactured by the applicant, are two subscriber groups, 11a and 11b. In this example, subscriber group 11a comprises three telecommunication terminals and it is connected via a private branch exchange 9 and e.g. standard 2 Mbit/s link to the telephone exchange LE. Between the branch exchange 9 and the telephone exchange LE, e.g. QSIG signalling is used. QSIG signalling is a preferred example of the signalling to be used. Other possible signalling alternatives are e.g. DSS1+ and DPNSS. Subscriber group 11b is a Centrex group, which in this example comprises three telecommunication terminals. Between the telephone exchange and the telephone network ISDN, e.g. ISUP signalling is used.

In the example presented in FIG. 2, the VPN network consists of subscriber groups 11a and 11c, the private branch exchanges 9 and 10, the two telephone exchanges and the intermediary logically connected to one of them. Additionally connected to the VPN network is a Centrex group 11b. Communication between the branch exchanges connected to the telephone exchanges can be effected via a telecommunication network. In this example, the telecommunication network is an ISDN telephone network. Let it be noted that FIG. 2 only presents a preferred example of the system of the invention. By way of example, let it be stated that a VPN network may consist of e.g. only one telephone exchange with two branch exchanges and an intermediary connected to it.

Software block 2 is used to produce intermediary services by utilizing the signalling of the virtual private network. Software block or interface 3 makes it possible to use QSIG signalling for the production of intermediary services. The DX 200 telephone exchange manufactured by the applicant comprises a QSIG interface. The interface consists of e.g. a 2 Mbit/s interface, comprising up to thirty 64 kbit/s B-channels and one 64 kbit/s D-channel.

Software block or interface 4 allows the use of DPNSS signalling for the production of intermediary services, and software block or interface 5 allows the use of DSS1+ signalling for the production of intermediary services.

The intermediary 1 additionally comprises a software block or software blocks 6 for serving one or more virtual private networks. The software block or blocks comprise one or more databases containing information essential for the production of services for a given VPN network. The telephone exchanges VPN-LE, LE and the intermediary comprise a numbering table 7 which allows the provision of centralized intermediary services. The numbering table contains e.g. the numbers included in the public numbering plan that correspond to the private numbering plan associated with a given VPN network. However, the above-described solution regarding the placement of the numbering tables is only an example of the location of the numbering tables. The intermediary presented in FIG. 2 supports the generally known intermediary services.

In an embodiment according to FIG. 2, QSIG signalling is used between the intermediary and the telephone exchange. There may arise a situation where a section of the network does not support QSIG signalling. This can be detected at the time of call setup. In case of such a situation, certain actions to be taken can be defined in advance. Call setup may be allowed or alternatively call setup may be interrupted. Between the intermediary and the telephone exchange, it is also possible to use other than QSIG signalling. The essential point is that the signalling can be used to implement the required intermediary services. The protocol used may be manufacturer-specific. In such cases, the signalling sent by the intermediary is only converted in the telephone exchange e.g. into QSIG signalling. Correspondingly, QSIG signalling is converted in the receiving end telephone exchange back into the signalling used.

Instead of QSIG signalling, it is possible to use e.g. DPNSS or DSS1+ signalling for the production of intermediary services. Correspondingly, the above-mentioned protocols can be used between the telephone exchanges in the telephone network. If the telephone network used is an ISDN network, then the signalling between the telephone exchanges LE and VPN-LE is encapsulated in ISUP messages.

In an embodiment according to FIG. 2, the telephone exchange supporting VPN service comprises a special database in which are stored all the numbers included in the public numbering plan that correspond to the private numbering plan. The VPN service can be extended to form a service that can be used between several exchanges, in which case each exchange has a corresponding database. In the signalling between two VPN exchanges, a number comprised in the private numbering plan is converted into a number belonging to the public numbering plan. A further possibility is that only the prefixes associated with the private numbering plan are stored in the telephone exchanges implementing a VPN network. In this case, for instance the prefix yy, which may have a length of e.g. 1–8 digits, is stored in the telephone exchange. Now, calls coming from a private branch exchange connected to the telephone exchange and carrying the number yyxx (xx e.g. 2–8 digits) are understood to be internal calls to another private branch exchange within the virtual private network and are therefore directed to the telephone exchange. The number may comprise several prefixes, each prefix representing e.g. a different branch exchange or Centrex group in the VPN network. It is further possible that the database used in the numbering plan is an external database. In this case, the database is e.g. the database of an intelligent network (IN). All calls to be set up are first directed to the intelligent network, from where they are connected further.

In an embodiment according to FIG. 2, connected to the virtual private network are individual subscribers, private branch exchanges which do not support the private network protocol, or e.g. mobile subscribers. Branch exchanges of the type described are e.g. R2 and DASS2 branch exchanges. In this case, it is possible to make a definition specifically for each number to the effect that the intermediary shall only use a limited choice of services for these subscribers. It is possible to specify that the intermediary shall not use the QSIG protocol when setting up calls to these subscribers.

FIG. 3 presents a preferred example of a system in which the method of the invention can be implemented. The system comprises a telephone exchange SSP which simultaneously acts as a switching point in an intelligent network. In this example, the system only comprises one telephone exchange. However, this is only one example of a possible system. The telephone exchange is e.g. a DX 200 manufactured by the applicant. The telephone exchange SSP may be a part of a larger telephone network. Logically connected to the telephone exchange are an intermediary TE and a service control point of the intelligent network. Logical connection of the intermediary means that the intermediary is not necessarily directly connected to the telephone exchange but may instead be connected via various access solutions. FIG. 4 gives a more detailed illustration of these solutions.

The function of the intermediary TE is to produce services associated with the VPN network. In this context, 'intermediary' refers e.g. to a telephone set equipped for intermediary services or to a computer provided with facilities for intermediary services. Further, the concept of 'intermediary' may comprise a human user of the above-mentioned equipment. In this example, the intermediary is connected to the telephone exchange using QSIG signalling. However, it is also possible to use other signalling schemes, such as e.g. DPNSS or DSS1+ signalling. The intelligent network service control point SCP comprises a numbering table 8, which allows centralized production of intermediary services. The numbering table contains conversion data for conversion between a number included in the public telephone network and a VPN-network specific number. In this example, the number conversion is not necessarily performed in the telephone exchange SSP but instead in the intelligent network service control point. Having performed the number conversion, the service control point returns the conversion result to the telephone exchange SSP.

Connected to the telephone exchange SSP are subscriber groups 20 and 21. Subscriber group 20 is connected to the telephone exchange via a private branch exchange PINX, while subscriber group 21 is connected directly to the Centrex interface of the telephone exchange. In addition, a subscriber group 22 comprising two mobile subscribers is connected to the telephone exchange via a Public Land Mobile Network PLMN. The public land mobile network is e.g. a GSM network (GSM, Global System for Mobile Communications). In this example, the private branch exchange PINX is connected to the telephone exchange using QSIG signalling. Other signalling systems may also be used.

FIG. 4 presents a few examples of how an intermediary can be connected to a telephone exchange. Generally speaking, the intermediary is connected to the telephone exchange via a logical connection.

In a first case, the intermediary TE is connected directly via an ISDN network terminal NT1 to the telephone exchange LE. The interface between the network terminal NT1 and the telephone exchange is preferably a basic rate ISDN interface connection. The basic rate interface comprises two data channels and one signalling channel.

In a second case, the intermediary TE2 is connected to the telephone exchange via a Remote Subscriber Stage RSS. The intermediary TE2 is connected to the remote subscriber stage via a network terminal NT2. The connection between the network terminal NT2 and the remote subscriber stage is preferably a basic rate ISDN connection.

In a third case, the intermediary TE3 is connected via a network terminal to multiplexers MUX1 and MUX2 and from these further to the telephone exchange LE. The connection between the network terminal NT3 and multiplexer MUX1 and between multiplexer MUX2 and the telephone exchange LE is preferably a basic rate ISDN connection.

In a fourth case, the intermediary TE4 is connected via a network terminal NT4 and an Access Node AN to the telephone exchange LE. The interface between the telephone exchange and the access node is preferably a V5 interface. This may be e.g. a V5.2 interface. The connection between the network terminal NT4 and the access node is preferably a basic rate ISDN connection.

The invention is not restricted to the examples of its embodiments described above; instead, many variations are possible within the scope of the inventive idea defined in the claims.

What is claimed is:

1. Method for implementing a centralized intermediary service in a telecommunication system comprising:
   a telephone network, which comprises one or more telephone exchanges;
   a private numbering plan provided in the telephone network;
   a telephone exchange belonging to the telephone network and implementing the private numbering plan;
   an intermediary;
   said method comprising the steps of:
      establishing one or more virtual private networks in the telecommunication system;
      using for internal calls within the virtual private network the private numbering plan established;
      wherein the method further comprises the steps of:
         connecting the intermediary to the telephone exchange; and
         using the signalling of the virtual private network for the production of intermediary services.

2. Method as defined in claim 1, wherein the QSIG signalling is used for the production of intermediary services.

3. Method as defined in claim 1, wherein the DPNSS signalling is used for the production of intermediary services.

4. Method as defined in claim 1, wherein the DSS1+ signalling is used for the production of intermediary services.

5. Method as defined in claim 1, wherein the intermediary is connected to one or more virtual private networks.

6. Method as defined in claim 1, wherein a numbering table enabling the provision of centralized intermediary services is implemented in the telephone exchange and/or the intermediary.

7. Method as defined in claim 1, wherein the telephone network is connected to an intelligent network; and
   a numbering table enabling the provision of centralized intermediary services is implemented in a database in the intelligent network.

8. Method as defined in claim 1, wherein the ISUP protocol is used for internal signalling in the in telephone network.

9. System for implementing a centralized intermediary service in a telecommunication system comprising:
   a telephone network which comprises one or more telephone exchanges;
   a private numbering plan provided in the telephone network;
   a telephone exchange belonging to the telephone network and implementing the private numbering plan;
   an intermediary;
   one or more virtual private networks comprising the private numbering plan established, which is used for internal calls within the virtual private network;
   wherein the system comprises:
      an intermediary connected to the telephone exchange; and means for producing intermediary services by using the signalling of the virtual private network.

10. System as defined in claim 9, wherein the system comprises means for using QSIG signalling for the production of intermediary services.

11. System as defined in claim 9, wherein the system comprises means for using DPNSS signalling for the production of intermediary services.

12. System as defined in claim 9, wherein the system comprises means for using DSS1+ signalling for the production of intermediary services.

13. System as defined in claim 9, wherein the system comprises means for serving one or more virtual private networks.

14. System as defined in claim 9, wherein the system comprises a numbering table enabling the provision of centralized intermediary services.

15. System as defined in claim 9, wherein the system comprises:
- an intelligent network connected to the telephone network;
- a numbering table in the database of the intelligent network, enabling the provision of intermediary services.

16. Method as defined in claim 9, wherein the system comprises an ISUP protocol, which is used for internal signalling in the telephone network.

* * * * *